(12) United States Patent
Brown et al.

(10) Patent No.: US 7,019,757 B2
(45) Date of Patent: Mar. 28, 2006

(54) CHANGING THE ALPHA LEVELS OF AN APPLICATION WINDOW TO INDICATE A STATUS OF A COMPUTING TASK

(75) Inventors: Michael Wayne Brown, Georgetown, TX (US); Andrew Douglas Hately, Austin, TX (US); Kelvin Roderick Lawrence, Round Rock, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 10/059,088

(22) Filed: Jan. 28, 2002

(65) Prior Publication Data

US 2003/0142108 A1   Jul. 31, 2003

(51) Int. Cl.
*G09G 5/02* (2006.01)
(52) U.S. Cl. .................. 345/592; 345/589; 345/593
(58) Field of Classification Search ............... 345/589, 345/592, 593, 768
See application file for complete search history.

(56) References Cited

U.S. PATENT DOCUMENTS

| | | | |
|---|---|---|---|
| 5,463,775 A | 10/1995 | DeWitt et al. | 395/184 |
| 5,572,672 A | 11/1996 | Dewitt et al. | 395/184 |
| 5,651,107 A * | 7/1997 | Frank et al. | 715/768 |
| 5,764,229 A | 6/1998 | Bennett | 345/345 |
| 5,805,163 A | 9/1998 | Bagnas | 345/345 |
| 5,889,530 A | 3/1999 | Findlay | 345/440 |
| 5,892,511 A | 4/1999 | Gelsinger et al. | 345/340 |
| 5,999,191 A | 12/1999 | Frank et al. | 345/435 |
| 6,002,397 A | 12/1999 | Jaaskelainen, Jr. | 345/340 |
| 6,049,798 A | 4/2000 | Bishop et al. | 707/10 |

FOREIGN PATENT DOCUMENTS

| | | |
|---|---|---|
| EP | 0684542 A1 | 11/1995 |
| EP | 1083485 | * 10/1999 |

OTHER PUBLICATIONS

IBM Technical Disclosure Bulletin, "Pop-up Window Shadow", vol. 34, No. 6, Nov. 1991, pp. 42-43.
IBM Technical Disclosure Bulletin, "Translucent Window Attribute", vol. 36, No. 06A, Jun. 1993, pp. 135-136.
IBM Technical Disclosure Bulletin, "Translucent Windows: Dragging an Image without Obscuring the Desktop:", vol. 37, No. 10, Oct. 1994, p. 15.

(Continued)

*Primary Examiner*—Matthew C. Bella
*Assistant Examiner*—G. F. Cunningham
(74) *Attorney, Agent, or Firm*—Marilyn Smith Dawkins; Amy J. Pattillo

(57) ABSTRACT

A method, system, and program for changing the alpha levels of an application window to reflect the status of a non-interactive computing task are provided. An alpha level is determined to represent a status of a non-interactive computing task. A transparency of at least a selected portion of a displayable object associated with the non-interactive computing task is graphically adjusted according to the alpha level, such that the status of the non-interactive computing task is displayed by the associated displayable object, where one type of displayable object includes an application window.

33 Claims, 4 Drawing Sheets

OTHER PUBLICATIONS

IBM Technical Disclosure Bulletin, "Independent Pixel Interpretation of Windowed Overlays/Underlays", vol. 38, No. 09, Sep. 1995, pp. 365-367.
IBM Research Disclosure 411119, "Reducing Desktop Clutter in GUI", Jul. 1998, p. 995.
IBM Research Discloure 431180, "Progressively animated graphical overlays", Mar. 2000, p. 592.
Make the Language Bar Transparent, 1 page, wysiwyg://fraContent.fraRightFrame.50/ht olbar_change_transparency.asp?frame=true.
TUCOWS Shell Enhancements Trans-XP, 2 pages, wysiwyg://20/http://www.tucows.com/system/preview/232626.html.
The Iconfactory: Your Quality Freeware Icons Hub (ibxp_home.asp), 2 pages, http://www.iconfactory.com/ibxp_home.asp.
Tweak_XP, 2 pages, http://www.totalidea.ce/transxp.htm.
Trans-XP Information, Details, and Download from VoodooFiles.com, 1 page, wysiwyg://15/http://www.voodoofiles.com/5817.
Cronosoft, 1 page, wysiwyg://26/http://www.cronosoft.com/download/qhwxp/index.htm.
Windows XP Home Page, 1 page, wysiwyg://33/http://www.microsoft.com/windowssxp/default.asp.

* cited by examiner

| TRANSLUCENCY PREFERENCES | | | 80 |
|---|---|---|---|
| EDIT 72 | ADD 74 | DELETE 76 | |
| GRAPHICAL OBJECT 82 | NON-COMPUTING TASKS 84 | TRANSPARENCY 86 | COLOR 88 |
| WINDOW APPL #1 | MEMORY CPU | 50%-0% 80%-10% | PURPLE TEAL |
| WINDOW APPL #2 | SIZE > 50KB | 100%-0% | ORANGE |
| ICON APPL #1 | SOUND CARD | OSCILLATING | MULTI COLOR |
| ALL | GRAPHICS CARD > 75% | 50%-0% | RED |

CHANGING THE ALPHA LEVELS OF AN APPLICATION WINDOW TO INDICATE A STATUS OF A COMPUTING TASK

CROSS-REFERENCE TO RELATED APPLICATIONS

The present application is related to the following applications, which are filed on even date herewith and incorporated herein by reference:
(1) U.S. patent application Ser. No. 10/059,093; and
(4) U.S. patent application Ser. No. 10/059,011;
(3) U.S. patent application Ser. No. 10/059,092;
(4) U.S. patent application Ser. No. 10/059,027;
(5) U.S. patent application Ser. No. 10/058,532;
(6) U.S. patent application Ser. No. 10/059,086;
(7) U.S. patent application Ser. No. 10/058,397;
(8) U.S. patent application Ser. No. 10/058,772;
(9) U.S. patent application Ser. No. 10/058,300;
(10) U.S. patent application Ser. No. 10/058,493; and
(11) U.S. patent application Ser. No. 10/058,599;

BACKGROUND OF THE INVENTION

1. Technical Field

The present invention relates in general to computer systems and, in particular, to graphical user interfaces. Still more particularly, the present invention relates to changing the alpha levels of a displayable object within a graphical user interface to indicate a status of a computing task.

2. Description of the Related Art

Most computer systems include multiple types of software for controlling the functions of the computer system. A first type of software is system software (operating systems), which controls the workings of the computer. A second main type of software is applications, such as word processing programs, spreadsheets, databases, and browsers, which perform the tasks for which people use computers. In addition, a computer system may include network software, which enables groups of computers to communicate, and language software, which provides programmers with the tools they need to write programs.

Software contains many instructions typically executed by a processor and other hardware within a computer system. As instructions are executed, the status or progress of multiple parts of the computer system is often monitored. In particular, the status is the condition, at a particular time, of any of numerous elements of computing including, but not limited to, a device, a communications channel, a network station, a software program, a bit, or another element. A status may be utilized to report on or to control computing tasks.

Most operating systems provide a graphical user interface (GUI) for controlling a visual computer environment. The GUI represents programs, files, and options with graphical images, such as icons, menus, and dialog boxes on the screen. Graphical items defined within the GUI work the same way for the user in most software because the GUI provides standard software routines to handle these elements and report the user's actions.

A typical graphical object defined by a GUI is a window or other defined area of a display containing distinguishable text, graphics, video, audio and other information for output. A display area may contain multiple windows associated with a single software program or multiple software programs executing concurrently.

Often when multiple graphical objects are displayed concurrently, the graphical objects will overlap. The order in which graphical objects are drawn on top of one another onscreen to simulate depth is typically known as the z-order. Typically, those objects at the top of the z-axis obscure the view of those graphical objects drawn below.

Monitoring software may be provided for a user to select to display the status of computing tasks within the GUI. In particular, such monitoring software typically utilizes an additional window, overlapping other open windows, for displaying tables of status information. Requiring an additional window to display monitored status information about computing tasks limits the total amount of screen space and may completely obscure the windows for which status information is being received. Further, typically monitored information is not described in a manner such that it is easily distinguishable from one application window to another.

Therefore, in view of the foregoing, it would be advantageous to provide a method, system, and program for displaying status information about computing tasks according to each application window, wherein open application windows are not obscured by the display. Further, it would be advantageous to display such information status information about computing tasks according to each application window where overlapping windows will not obscure the status information.

SUMMARY OF THE INVENTION

In view of the foregoing, it is therefore an object of the present invention to provide an improved computer system.

It is another object of the present invention to provide an improved graphical user interface.

It is yet another object of the present invention to provide a method, system and program for changing the alpha levels of an application window within a graphical user interface to indicate a status of a computer task.

According to one aspect of the present invention, an alpha level is determined to represent a status of a non-interactive computing task. A non-interactive task may include, for example, usage of a processor, memory, a sound card, a graphics card, a storage device, and network bandwidth.

A transparency of at least a selected portion of a displayable object associated with the non-interactive computing task is graphically adjusted according to the alpha level, such that the status of the non-interactive computing task is displayed according to the associated displayable object. A displayable object may include, for example, an application window, an icon, a video representation, and a graphical representation. In addition to adjusting a transparency of a displayable object to indicate the status of an associated non-interactive computing task, the color of a displayable object may also be adjusted.

According to an advantage of the present invention, the transparency of a displayable object associated with an installation program may become more transparent as the program installs. According to another advantage of the present invention, a displayable object associated with a browser may become less transparent as a page loads.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
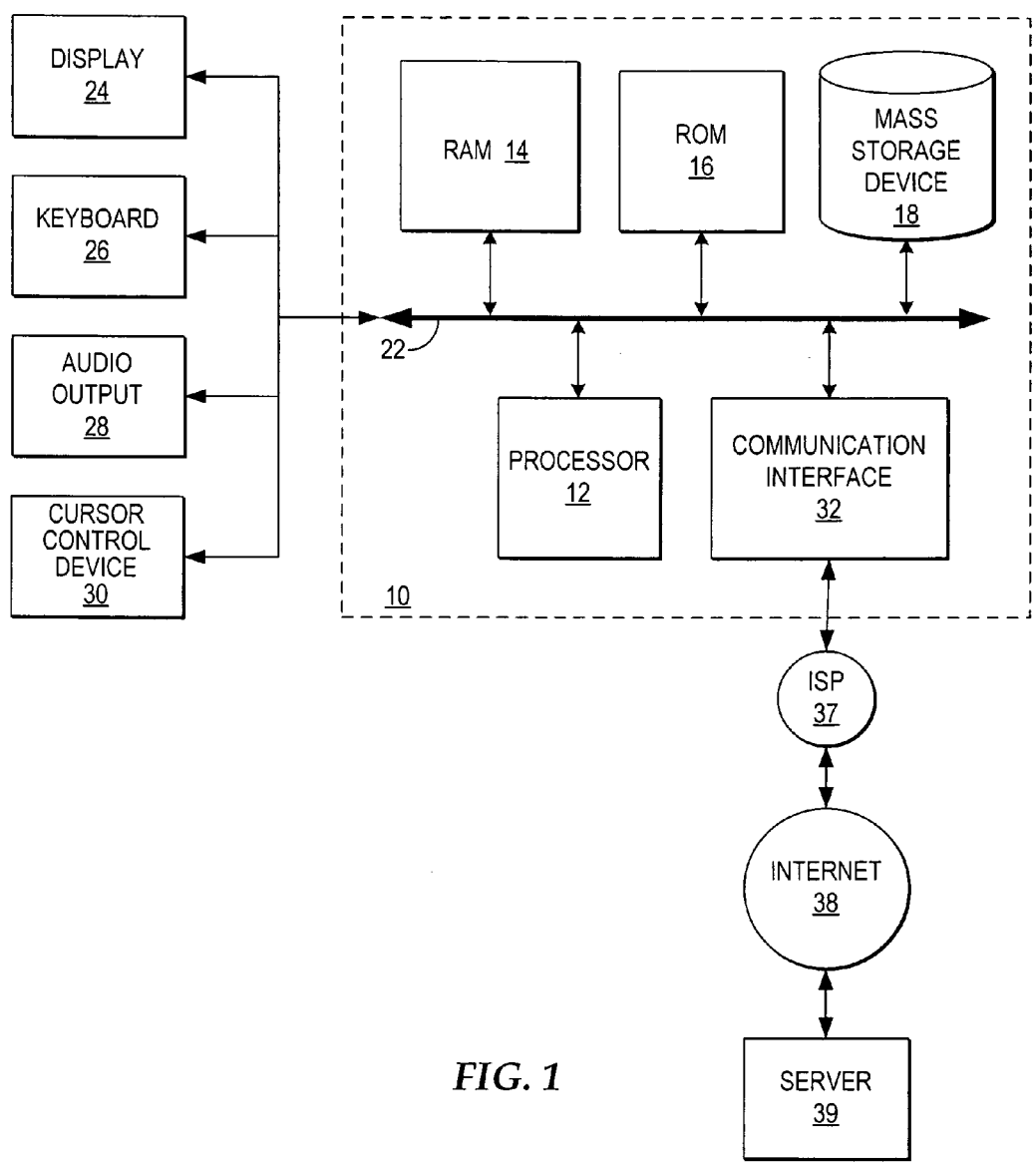
FIG. 1 depicts one embodiment of a computer system with which the method, system and program of the present invention may advantageously be utilized.

A method, system, and program for changing the alpha levels of an application window to indicate a status of a computing task are provided. In addition to application windows, the transparency of other displayable objects may be adjusted without effecting the z-order of those displayable objects. A "displayable object" may include text, icons, video, graphics, windows, or other logical graphical representations displayable within a display area. Displayable objects may be hidden or visible. Further, displayable objects may be layered in a z-order. Moreover, a displayable object may utilize a portion of a display area or may extend across the entirety of a display area. A displayable object may or may not include definable boundaries.

A z-order is the order along the z-axis in which displayable objects appear. Through a z-buffering technique, a depth is associated with each displayable object such that each object appears to be set at a particular depth in comparison with other displayable objects. There may be n-levels of layers within the z-order, where multiple displayable objects may be positioned within a particular n-level of the z-order.

The z-order may be a result of the order in which a user opens displayable objects onto the display. Alternatively, according to one advantage of the present invention, a user may designate for the z-order to be set according to a particular criteria.

Transparency is a graphical feature that is particularly advantageous to the present invention when utilizing a shading characteristic of a window to indicate the status of a computing task. As will be understood by one skilled in the art, by making a displayable object appear transparent on a computer screen, other displayable objects below the displayable objects are visible through the resource aid. Therefore, by adjusting the transparency of a window, information may be conveyed. Further, the transparency of a displayable object may be adjusted from opaque to totally transparent.

Typically, the transparency attribute is stored with color values in an alpha channel. In the present invention, adjusting the alpha levels of windows corresponds to adjusting transparency attributes stored in the alpha channels. Alpha levels are adjusted according to the status of a computing task.

Then, when calculating the appearance of a given pixel, the graphic processor uses the alpha channel values to determine the pixel's color through a process termed alpha blending. Through alpha blending, the process adds a fraction of the color of the transparent object set by the alpha channel value to the color of the displayable object below. Mixing the colors together gives the appearance that the displayable object below is seen through a layer of the transparent displayable object. In addition to alpha blending, additional shading may be added to create shadows and other graphical images to cue the viewer to the position of the transparent displayable object.

In the present invention, a computing task may be interactive or non-interactive. Interactive computing tasks are those performed in direct response to a user input, such as a keystroke, cursor input, or other. Non-interactive computing tasks are those not performed in direct response to a user input. For example, memory and CPU utilization are not typically performed in direct response to a user input, but are utilized as a function of an application functioning within the computer system. In an example, where a user selects a button associated with an audio function, the interactive computing task is the actual output of the audio in response to the selection while the non-interactive computing tasks include at least usage of a sound card, memory, and CPU.

Advantageously, in the present invention, non-interactive computing tasks may include, but are not limited to, use of memory, use of CPUs, number of CPUs utilized, use of graphics cards for two-dimensional (2D) and three-dimensional (3D) graphics, use of a sound card, number of threads, use of storage devices, and net bandwidth. As will be understood by one with skill in the art, additional software, hardware, and network related non-interactive computing tasks may be utilized within the present invention.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardware Overview

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also include, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIG. 6 and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network in link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communication interface 32, which carry the digital or analog data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. Display 24 may include both non-transparent surfaces, such as monitors, and transparent surfaces, such as headset sunglasses or vehicle windshield displays.

A keyboard 26 and cursor control device 30, such as a mouse, trackball, or cursor direction keys, are coupled to bus 22 as interfaces for user inputs to computer system 10. Keyboard 26 and cursor control device 30 can control the position of a cursor positioned within a display area of display 24. It should be understood that keyboard 26 and cursor control device 30 are examples of multiple types of input devices that may be utilized in the present invention. In alternate embodiments of the present invention, additional input and output peripheral components may be added.

Alpha Levels Corresponding to Status Context

Figure 2:
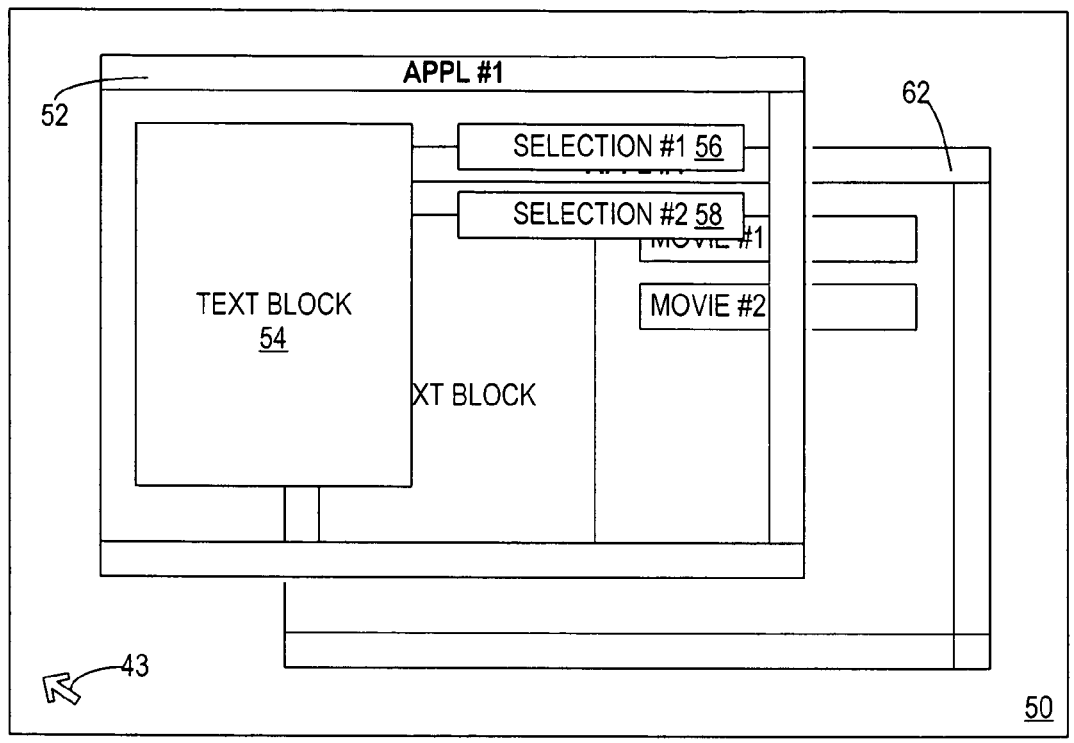
FIG. 2 illustrates a graphical representation of a user interface in which alpha levels of applications windows are adjusted to indicate the status of a computing task in accordance with the method, system, and program of the present invention.

With reference now to FIG. 2, there is depicted a graphical representation of a user interface in which alpha levels of applications windows are adjusted to indicate the status of a computing task in accordance with the method, system, and program of the present invention. As illustrated, a user interface 50 includes applications windows 52 and 62.

According to one advantage of the present invention, selected portions of each application window or other displayable object may be adjusted in transparency. In the present example, window 52 is 100% transparent. However, the border of window 52, text block 54 and selectable buttons 56 and 58 are not adjustable in transparency. Therefore, portions of window 62 that are overlapped by window 52 are visible through the transparent portions of window 52.

Preferably, a transparency of each window adjusts according to the status of a non-interactive computing task associated with each window. For example, in the present example, if the computing task being measured is graphics card usage, then the transparency of window 52 adjusts to represent no usage of the graphics card while window 62 remains opaque to represent a level of usage. While in the present example the same computing tasks are depicted in multiple windows by transparency levels, in alternate embodiments, alternate computing tasks may be depicted in multiple windows by transparency levels. For example, a transparency of window 52 may adjust according to the status of an installation application during an installation process.

As a further advantage of the present invention, although not depicted, the transparency of window 62 may oscillate according to a frequency spectrum for the sound intended for generation in association with the window. By oscillating the transparency of a window according to the frequency spectrum of sound, a visual cue is provided to a user of the sound intended for generation in association with the window.

The present invention is particularly advantageous because the status of computing tasks associated with multiple windows are viewable concurrently independent of whether a window is active or not. In addition, as depicted in the present example, the present invention is advantageous where a single computing task is utilized to adjust transparency in all open windows, because the window utilizing the most resources is typically most visible without adjusting the z-order of the windows.

Figure 3:
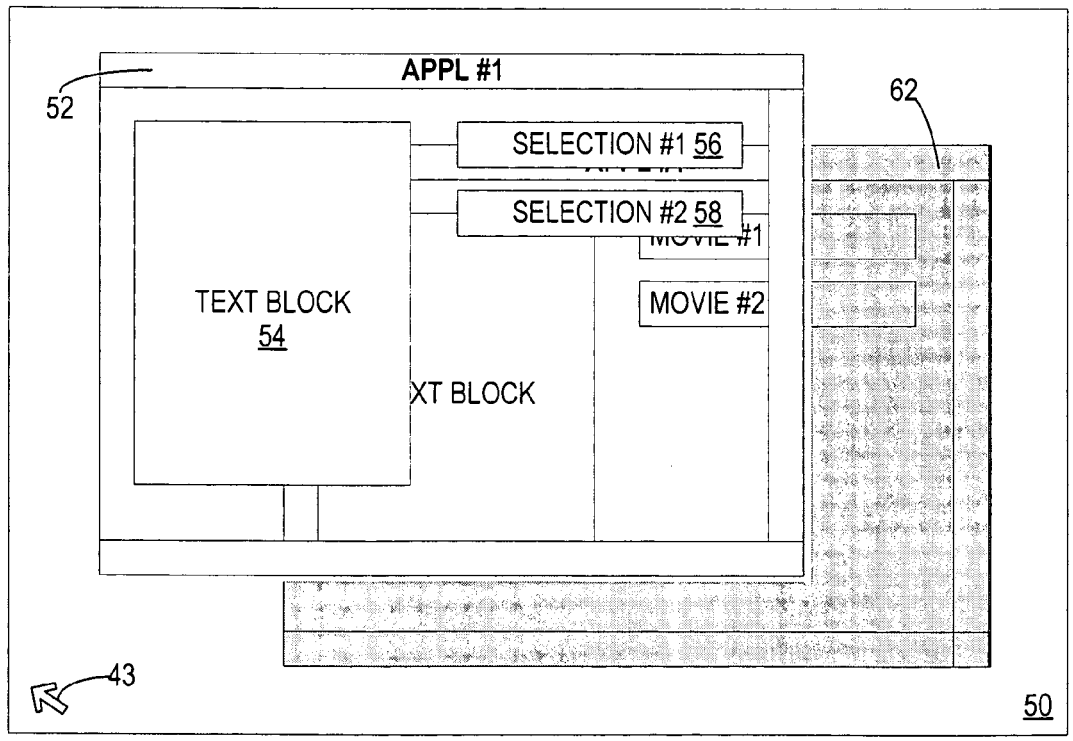
FIG. 3 depicts a graphical representation of a user interface in which alpha levels of applications windows are adjusted from those depicted in FIG. 2 to indicate the status of a computing task in accordance with the method, system, and program of the present invention.

Referring now to FIG. 3, there is illustrated a graphical representation of a user interface in which alpha levels of applications windows are adjusted from those depicted in FIG. 2 to indicate the status of a computing task in accordance with the method, system, and program of the present invention.

According to one advantage of the present invention, the transparency of windows adjusts over time as the status of non-interactive computing tasks adjust. In the present example, the transparency of window 52 is adjusted to 80% transparency to represent usage of the sound card in association with window 52. In addition, in the present example, the transparency of window 62 is adjusted to 50% transparency to represent a shift in sound card usage when compared to the transparency associated with window 62 in FIG. 2.

Figures 4, 5:
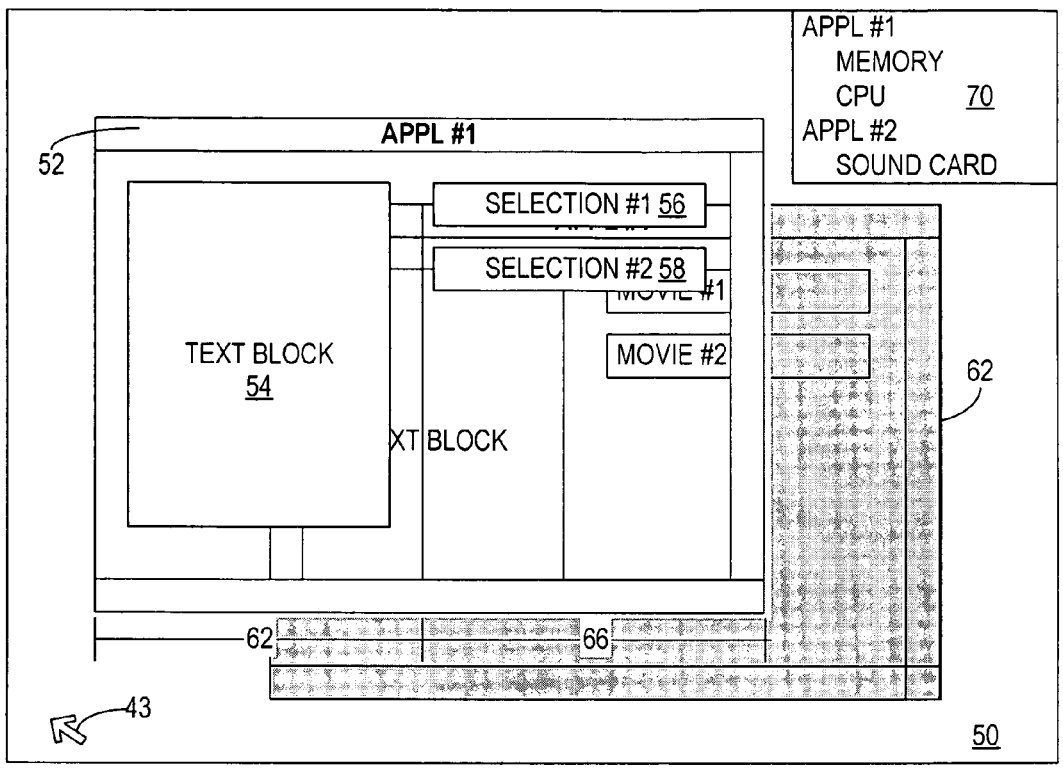
FIG. 4 illustrates a graphical representation of a user interface in which alpha levels of application windows are adjusted to indicate the status of multiple computing tasks in accordance with the method, system, and program of the present invention.
FIG. 5 depicts a graphical representation of selectable transparency preferences set by a user in accordance with the method, system, and program of the present invention.

With reference now to FIG. 4, there is depicted a graphical representation of a user interface in which alpha levels of application windows are adjusted to indicate the status of multiple computing tasks in accordance with the method, system, and program of the present invention.

According to one advantage of the present invention, multiple transparency levels may be depicted within multiple sections of a single window, wherein each transparency level is associated with a separate computing task. In the present example, window 52 is divided into sections 64 and 66, wherein the transparency levels of sections 64 and 66 are each associated with a separate computing task. For example, the transparency level of section 64 may be associated with memory usage while the transparency level of section 66 may be associated with CPU usage.

As illustrated, the portion of window 62 overlapped by window 52 is adjusted in transparency according to the transparency levels of sections 64 and 66. In the present example, a single computing task is depicted by a transparency level with window 62, however in alternate embodiments, multiple computing tasks may be illustrated by multiple transparency levels within window 62.

Advantageously, a user may initiate, by keystroke, voice command or other input sequence, a legend for the computing tasks being depicted by transparency levels within each window. In one embodiment, the transparency level of window 62 may continue to represent sound card usage, as described in FIGS. 1 and 2. Alternatively, the transparency level of window 62 may adjust from representing one computing task to representing another computing task.

Referring now to FIG. 5, there is depicted a graphical representation of selectable transparency preferences set by a user in accordance with the method, system, and program of the present invention. As illustrated, multiple categories may be provided for a user to specify transparency preferences.

In the present example, categories include, but are not limited to, graphical objects 82, non-computing tasks 84, transparency level ranges 86, and colors 88. Advantageously, a user may specify graphical objects 82 according to windows, icons and other displayable objects or may designate a preference for all displayable objects.

In addition, a user may select from multiple selectable buttons to adjust the current transparency preferences. Selectable buttons include, but are not limited to, editing selection 72, adding selection 74, and deleting selection 76. In response to a selection of editing selection 72, a user is preferably enabled to edit current and past preferences. In response to a selection of adding selection 74, a user is preferably enabled to add a new preference. In response to a selection of deleting selection 76, a user is preferably enabled to delete a current preference.

Figure 6:
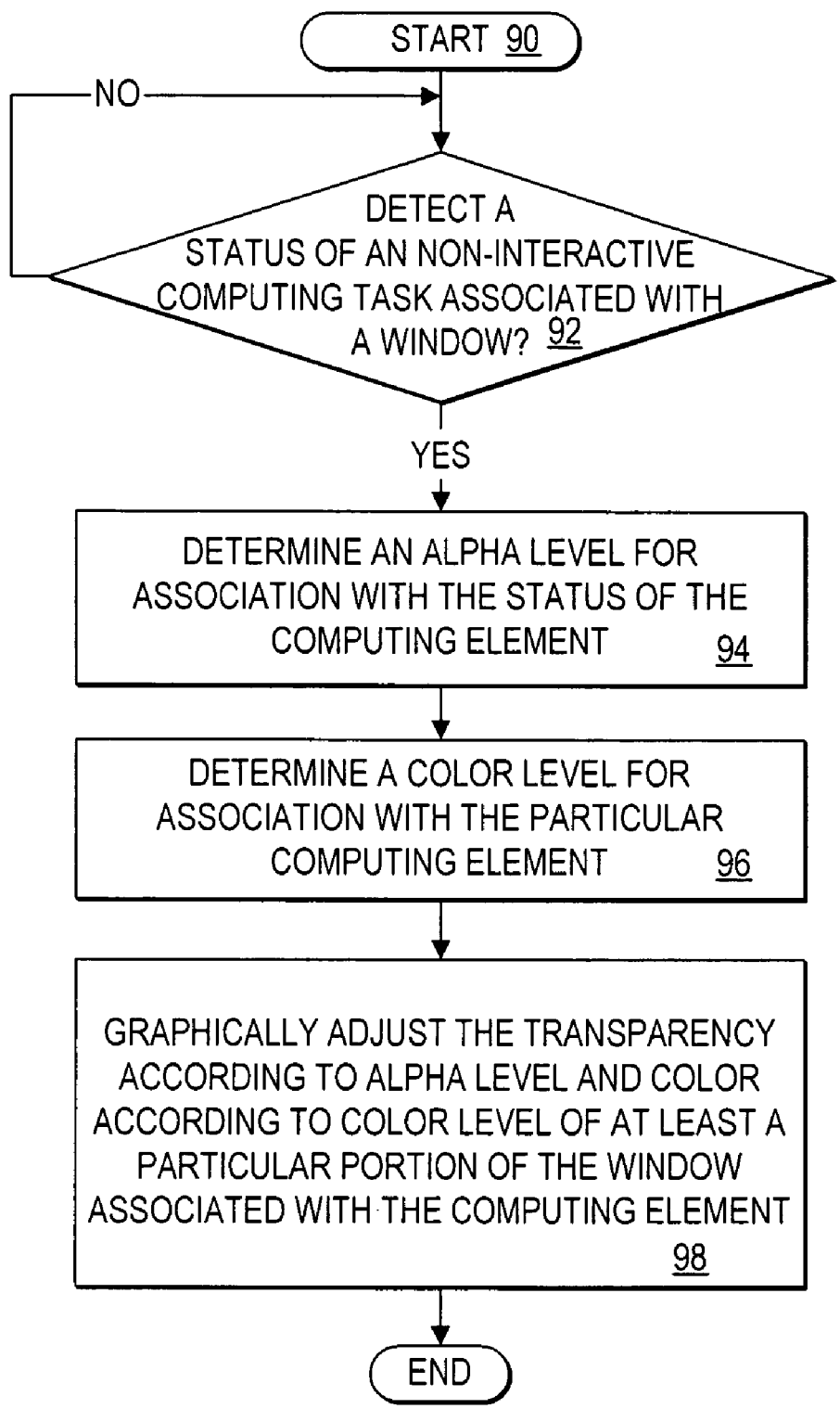
FIG. 6 illustrates a high level logic flowchart of a process and program for adjusting the transparency levels of application windows according to the status of computing tasks in accordance with the method, system, and program of the present invention.

With reference now to FIG. 6, there is illustrated a high level logic flowchart of a process and program for adjusting the transparency levels of application windows according to the status of computing tasks in accordance with the method, system, and program of the present invention. As depicted, the process starts at block 90 and thereafter proceeds to block 92.

Block 92 depicts a determination as to whether or not the status of a non-interactive computing task associated with a window is detected. If a status is not detected, then the process iterates at block 92. If a status is detected, then the process passes to block 94.

Block 94 illustrates determining an alpha level for association with the status of the computing element. Next, block 96 depicts determining a color level for association with the particular computing element. Thereafter, block 98 illustrates graphically adjusting the transparency according to the alpha level and color according to the color level of at least a particular portion of the window associated with the computing element; and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for changing alpha levels of a displayable object, said method comprising the steps of:
    determining an alpha level to represent a status of a non-interactive computing task;
    determining a color level to represent said non-interactive computing task;
    graphically adjusting a transparency of at least a selected portion of a displayable object associated with said non-interactive computing task according to said alpha level, such that said status of said non-interactive computing task is displayed by said associated displayable object; and
    graphically adjusting a color with said transparency according to said color level of said at least said selected portion of said displayable object associated with said non-interactive computing task.

2. The method for changing alpha levels of a displayable object according to claim 1, said method further comprising the step of:
graphically displaying concurrently a plurality of displayable objects independent of whether any of said plurality of displayable objects is active.

3. The method for changing alpha levels of a displayable object according to claim 1, said method further comprising the step of:
detecting said status for at least one from among usage of a processor, memory, a sound card, a graphics card, a storage device, and network bandwidth.

4. The method for changing alpha levels of a displayable object according to claim 1, said step of determining an alpha level further comprising the step of:
determining said alpha level according to a user preference for said transparency associated with said non-interactive computing task.

5. The method for changing alpha levels of a displayable object according to claim 1, said step of determining an alpha level further comprising the step of:
determining said alpha level, wherein said resulting transparency is uniform within said displayable object.

6. The method for changing alpha levels of a displayable object according to claim 1, said step of determining an alpha level further comprising the step of:
determining said alpha level, wherein said resulting transparency oscillates within said displayable object according to a frequency spectrum of a sound intended for output in association with said displayable object.

7. The method for changing alpha levels of a displayable object according to claim 1, said method further comprising the step of:
presenting a user with an interface for selecting transparency preferences, wherein said transparency preferences are utilized for determining said alpha level.

8. The method for changing alpha levels of a displayable object according to claim 1, said step of graphically adjusting a transparency further comprising the step of:
only graphically adjusting a transparency of transparency adjustable sections of said displayable object within said selected portion of said displayable object.

9. The method for changing alpha levels of a displayable object according to claim 1, said step of graphically adjusting a transparency further comprising the step of:
graphically adjusting a transparency of said displayable object comprising at least one of an application window, an icon, a video representation, and a graphical representation.

10. The method for changing alpha levels of a displayable object according to claim 1, said method further comprising the step of:
graphically adjusting a transparency of at least said selected portion of a displayable object associated with a progress of an installation program.

11. A system for changing alpha levels of a displayable object, said system comprising:
a graphical user interface for displaying a displayable object;
means for determining an alpha level to represent a status of a non-interactive computing task;
means for determining a color level to represent said non-interactive computing task;
means for graphically adjusting a transparency of at least a selected portion of said displayable object associated with said non-interactive computing task according to said alpha level; and
means for graphically adjusting said color with said transparency according to said color level of said at least said selected portion of said displayable object associated with said non-interactive computing task.

12. The system for changing alpha levels of a displayable object according to claim 11, said system further comprising:
means for graphically displaying concurrently a plurality of displayable objects within said graphical user interface independent of whether any of said plurality of displayable objects is active.

13. The system for changing alpha levels of a displayable abject according to claim 11, said system further comprising:
means for detecting said status for at least one from among usage of a processor, memory, a sound card, a graphics card, a storage device, and network bandwidth.

14. The system for changing alpha levels of a displayable object according to claim 11, said means for determining an alpha level further comprising:
means for determining said alpha level according to a user preference for said transparency associated with said non-interactive computing task.

15. The system for changing alpha levels of a displayable object according to claim 11, said means for determining an alpha level further comprising:
means for determining said alpha level, wherein said resulting transparency is uniform within said displayable object.

16. The system for changing alpha levels of a displayable object according to claim 11, said means for determining an alpha level further comprising:
means for determining said alpha level, wherein said resulting transparency oscillates within said displayable object according to a frequency spectrum of a sound intended for output in association with said displayable object.

17. The system for changing alpha levels of a displayable object according to claim 11, said system further comprising:
means for presenting a user with an interface for selecting transparency preferences, wherein said transparency preferences are utilized for determining said alpha level.

18. The system for changing alpha levels of a displayable object according to claim 11, said means for graphically adjusting a transparency further comprising:
means for only graphically adjusting a transparency of transparency adjustable sections of said displayable object within said selected portion of said displayable object.

19. The system for changing alpha levels of a displayable object according to claim 11, said means for graphically adjusting a transparency further comprising:
means for graphically adjusting a transparency of said displayable object comprising at least one of an application window, an icon, a video representation, and a graphical representation.

20. The system for changing alpha levels of a displayable object according to claim 11, said system further comprising:
means for graphically adjusting said transparency of at least said selected portion of a displayable object associated with a progress of an installation program.

21. A program for changing alpha levels of a displayable object, residing on a computer usable medium having computer readable program code means, said program comprising:
- means for computing an alpha level to represent a status of a non-interactive computing task;
- means for determining a color level to represent said non-interactive computing task;
- means for controlling a graphical adjustment to a transparency of at least a selected portion of a displayable object associated with said non-interactive computing task according to said alpha level; and
- means for controlling a graphical adjustment of said color with said transparency according to said color level of said at least said selected portion of said displayable object associated with said non-interactive computing task.

22. The program for changing alpha levels of a displayable object according to claim 21, said program further comprising:
- means for concurrently controlling a graphical display of a plurality of displayable objects independent of whether any of said plurality of displayable objects is active.

23. The program for changing alpha levels of a displayable object according to claim 21, said program further comprising:
- means for detecting said status for at least one from among usage of a processor, memory, a sound card, a graphics card, a storage device, and network bandwidth.

24. The program for changing alpha levels of a displayable object according to claim 21, said program further comprising:
- means for determining said alpha level according to a user preference for said transparency associated with said non-interactive computing task.

25. The program for changing alpha levels of a displayable object according to claim 21, said program further comprising:
- means for determining said alpha level, wherein said resulting transparency is uniform within said displayable object.

26. The program for changing alpha levels of a displayable object according to claim 21, said program further comprising:
- means for determining said alpha level, wherein said resulting transparency oscillates within said displayable object according to a frequency spectrum of a sound intended for output in association with said displayable object.

27. The program for changing alpha levels of a displayable object according to claim 21, said program further comprising:
- means for controlling output of a user interface for selecting transparency preferences, wherein said transparency preferences are utilized for determining said alpha level.

28. The program for changing alpha levels of a displayable object according to claim 21, said program further comprising:
- means for controlling graphical adjustment of only a transparency of transparency adjustable sections of said displayable object within said selected portion of said displayable object.

29. The program for changing alpha levels of a displayable object according to claim 21, said program further comprising:
- means for controlling graphical adjustment of a transparency of said displayable object comprising at least one of an application window, an icon, a video representation, and a graphical representation.

30. The program for changing alpha levels of a displayable object according to claim 21, said program further comprising:
- means for controlling graphical adjustment of a transparency of at least said selected portion of a displayable object associated with a progress of an installation program.

31. A method for changing alpha levels of a displayable object, said method comprising the steps of:
- determining an alpha level to represent a status of a non-interactive computing task; and
- graphically adjusting a transparency of at least a selected portion of a displayable object associated with said non-interactive computing task according to said alpha level, wherein said resulting transparency oscillates within said displayable object according to a frequency spectrum of a sound intended for output in association with said displayable object, such that said status of said non-interactive computing task is displayed by said associated displayable object.

32. A system for changing alpha levels of a displayable object, said system comprising:
- a graphical user interface for displaying a displayable object;
- means for determining an alpha level to represent a status of a non-interactive computing task; and
- means for graphically adjusting a transparency of at least a selected portion of said displayable object associated with said non-interactive computing task according to said alpha level, wherein said resulting transparency oscillates within said displayable object according to a frequency spectrum of a sound intended for output in association with said displayable object.

33. A program for changing alpha levels of a displayable object, residing on a computer usable medium having computer readable program code means, said program comprising:
- means for computing an alpha level to represent a status of a non-interactive computing task; and
- means for controlling a graphical adjustment to a transparency of at least a selected portion of a displayable object associated with said non-interactive computing task according to said alpha level, wherein said resulting transparency oscillates within said displayable object according to a frequency spectrum of a sound intended for output in association with said displayable object.

* * * * *

UNITED STATES PATENT AND TRADEMARK OFFICE
CERTIFICATE OF CORRECTION

PATENT NO. : 7,019,757 B2  Page 1 of 1
APPLICATION NO. : 10/059088
DATED : March 28, 2006
INVENTOR(S) : Michael Wayne Brown et al.

It is certified that error appears in the above-identified patent and that said Letters Patent is hereby corrected as shown below:

Col. 6, line 7, cancel "in" after "network" and before "link 34".
Claim 13, col. 10, line 13, "abject" should read --object--.

Signed and Sealed this

Twenty-eighth Day of November, 2006

JON W. DUDAS
*Director of the United States Patent and Trademark Office*